(12) United States Patent
Kubes

(10) Patent No.: US 8,624,452 B2
(45) Date of Patent: Jan. 7, 2014

(54) ELECTRIC MACHINE MODULE COOLING SYSTEM AND METHOD

(75) Inventor: Larry A. Kubes, Indianapolis, IN (US)

(73) Assignee: Remy Technologies, LLC, Pendleton, IN (US)

( * ) Notice: Subject to any disclaimer, the term of this patent is extended or adjusted under 35 U.S.C. 154(b) by 23 days.

(21) Appl. No.: 13/449,550

(22) Filed: Apr. 18, 2012

(65) Prior Publication Data

US 2012/0262012 A1   Oct. 18, 2012

Related U.S. Application Data

(60) Provisional application No. 61/476,448, filed on Apr. 18, 2011.

(51) Int. Cl.
*H02K 9/00* (2006.01)
(52) U.S. Cl.
USPC .................................. 310/54; 310/61
(58) Field of Classification Search
USPC .............................. 310/52, 54, 58, 59, 64, 61
See application file for complete search history.

(56) References Cited

U.S. PATENT DOCUMENTS

| | | | |
|---|---|---|---|
| 2,080,678 A | | 5/1937 | Van Horn et al. |
| 2,264,616 A | | 12/1941 | Buckbee |
| 3,447,002 A | | 5/1969 | Ronnevig |
| 3,525,001 A | | 8/1970 | Erickson |
| 3,748,507 A | | 7/1973 | Sieber |
| 3,950,665 A | * | 4/1976 | Schneider et al. ............ 310/260 |
| 4,038,570 A | | | 7/1977 Durley, III |
| 5,081,382 A | | 1/1992 | Collings et al. |
| 5,180,004 A | | 1/1993 | Nguyen |
| 5,207,121 A | | 5/1993 | Bien |
| 5,293,089 A | | 3/1994 | Frister |
| 5,372,213 A | | 12/1994 | Hasebe et al. |
| 5,519,269 A | * | 5/1996 | Lindberg ........................ 310/58 |
| 5,616,973 A | | 4/1997 | Khazanov |

(Continued)

FOREIGN PATENT DOCUMENTS

JP   05-103445 A   4/1993
JP   05-292704 A   11/1993

(Continued)

OTHER PUBLICATIONS

WIPO Search Report and Written Opinion dated Oct. 29, 2012 for corresponding Application No. PCT/US2012/033915; 8 sheets.

(Continued)

*Primary Examiner* — Nguyen N Hanh
(74) *Attorney, Agent, or Firm* — Greenberg Traurig LLP

(57) ABSTRACT

Embodiments of the invention provide an electric machine module including a housing. The housing can include an inner surface that defines a machine cavity. In some embodiments, an electric machine can be at least partially positioned within the machine cavity and can include a stator assembly. The stator assembly includes an outer diameter, a stator core, and a stator winding. The stator core can include at least two extended members that can radially extend from axial ends of the stator core. An annular member is coupled to the extended members to define a portion of a coolant jacket. The coolant jacket can be further defined between the annular member, the outer diameter of the stator assembly, and the extended members. The electric machine can be positioned within the housing so that the annular member is immediately adjacent to the inner surface.

18 Claims, 9 Drawing Sheets

(56) References Cited

U.S. PATENT DOCUMENTS

| | | |
|---|---|---|
| 5,859,482 A | 1/1999 | Crowell et al. |
| 5,923,108 A | 7/1999 | Matake et al. |
| 5,937,817 A | 8/1999 | Schanz et al. |
| 5,965,965 A | 10/1999 | Umeda et al. |
| 6,011,332 A | 1/2000 | Umeda et al. |
| 6,069,424 A | 5/2000 | Colello et al. |
| 6,075,304 A | 6/2000 | Nakatsuka |
| 6,087,744 A * | 7/2000 | Glauning ............. 310/58 |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,727,609 B2 * | 4/2004 | Johnsen ............. 310/52 |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 8,405,262 B1 * | 3/2013 | Beatty et al. ............. 310/58 |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2006/0226717 A1 * | 10/2006 | Nagayama et al. ............. 310/58 |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2008/0278011 A1 * | 11/2008 | Elgas et al. ............. 310/52 |
| 2009/0121562 A1 | 5/2009 | Yim |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

WIPO Search Report and Written Opinion dated Nov. 14, 2012 for corresponding Application No. PCT/US2012/040794; 8 sheets.
International Search Report.
International Search Report completed Apr. 19, 2012.
International Search Report completed Apr. 9, 2012.
International Search Report completed Apr. 20, 2012.
International Search Report completed Mar. 7, 2012.
International Search Report completed Apr. 24, 2012.

* cited by examiner

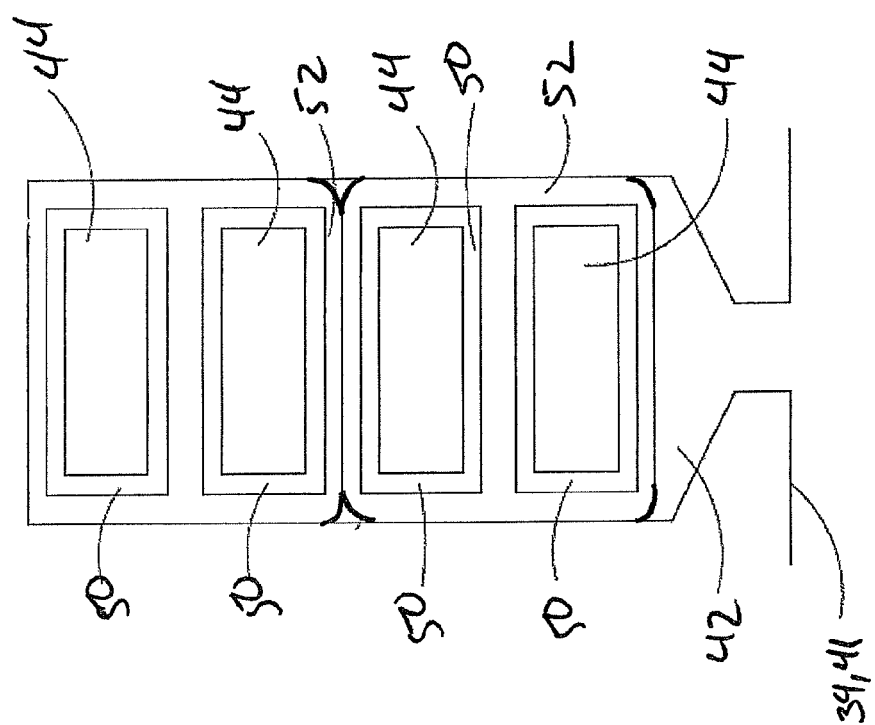

ELECTRIC MACHINE MODULE COOLING SYSTEM AND METHOD

RELATED APPLICATIONS

This application claims priority under 35 U.S.C. §119 to U.S. Provisional Patent Application No. 61/476,448 filed on Apr. 18, 2011, the entire contents of which is incorporated herein by reference.

BACKGROUND

Some conventional electric machines include a stator assembly disposed around a rotor assembly. Some stator assemblies include a plurality of conductors positioned within a stator core. During operation of some electric machines, a current flows through the at least some of the conductors. Moreover, during operation of some electric machines, heat energy can be generated by both the stator assembly and the rotor assembly, as well as some other components of the electric machine. The increase in heat energy produced by some elements of the electric machine can lead to inefficient machine operations.

SUMMARY

Some embodiments of the invention provide an electric machine module including a housing. The housing can include an inner surface that can define at least a portion of a machine cavity. In some embodiments, an electric machine can be at least partially positioned within the machine cavity and can include a stator assembly. In some embodiments, the stator assembly can include an outer diameter, a stator core, and a stator winding. In some embodiments, the stator core can include at least two extended members that can radially extend from axial ends of the stator core. In some embodiments, an annular member can be coupled to the extended members to define at least a portion of a coolant jacket. In some embodiments, the coolant jacket can be further defined by the outer diameter of the stator assembly and the extended members. In some embodiments, the electric machine can be positioned within the housing so that the annular member is immediately adjacent to the inner surface.

DESCRIPTION OF THE DRAWINGS

FIGS. 6A and 6B are cross-sectional views of a slot according to some embodiments of the invention.

DETAILED DESCRIPTION

Figure 1:
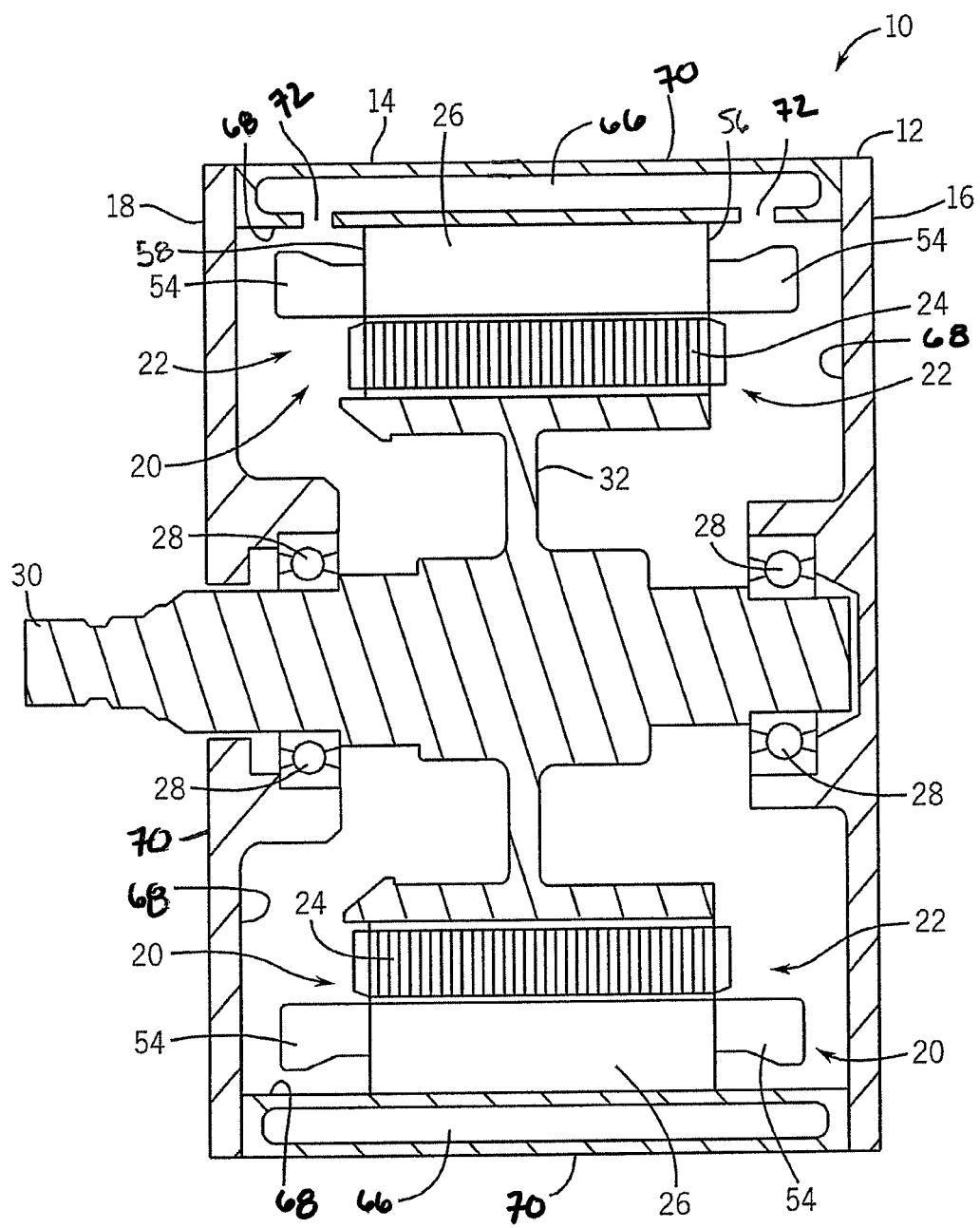
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
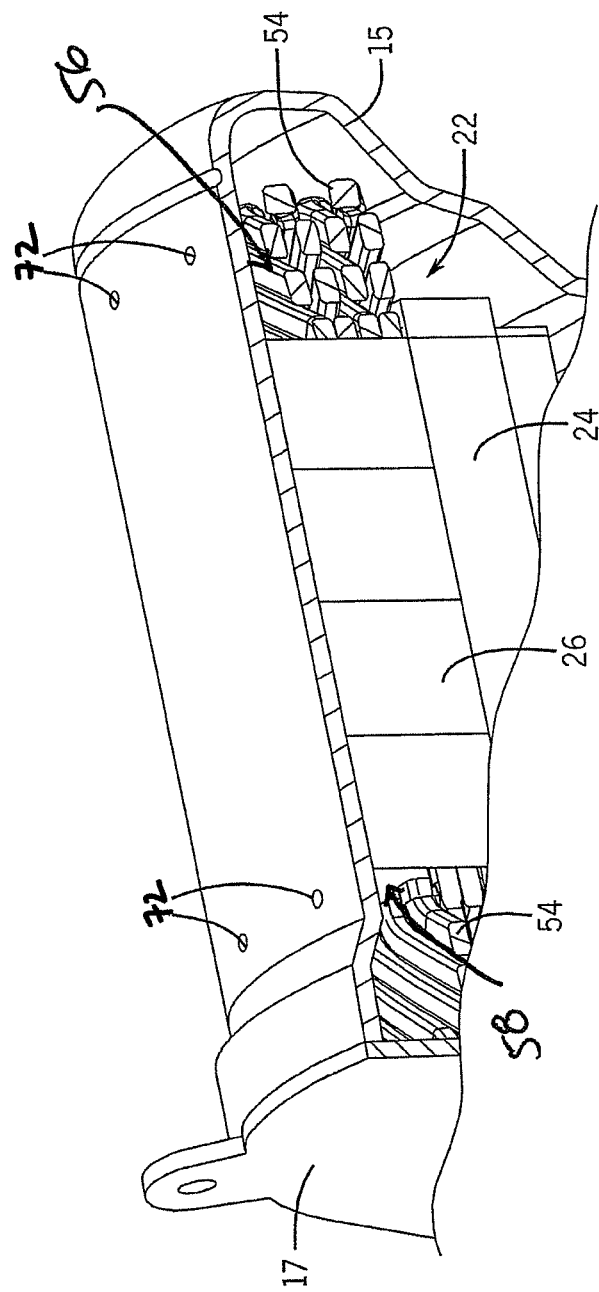
FIG. 2 is a cross-sectional view of an electric machine module according to one embodiment of the invention.

FIGS. 1 and 2 illustrate an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments, the housing 12 can comprise a substantially cylindrical canister 15 coupled to an end cap 17, as shown in FIG. 2. Further, in some embodiments, the housing 12 can comprise materials that can generally include thermally conductive properties, such as, but not limited to aluminum or other metals and materials capable of generally withstanding operating temperatures of the electric machine 20. In some embodiments, the housing 12 can be fabricated using different methods including casting, molding, extruding, and other similar manufacturing methods.

The electric machine 20 can include a rotor assembly 24, a stator assembly 26, and bearings 28, and can be disposed about a shaft 30. As shown in FIG. 1, the stator assembly 26 can substantially circumscribe at least a portion of the rotor assembly 24. In some embodiments, the rotor assembly 24 can also include a rotor hub 32 or can have a "hub-less" design (not shown).

In some embodiments, the electric machine 20 can be operatively coupled to the housing 12. For example, the electric machine 20 can be fit within the housing 12. In some embodiments, the electric machine 20 can be fit within the housing 12 using an interference fit, a shrink fit, other similar friction-based fits that can at least partially operatively couple the machine 20 and the housing 12. For example, in some embodiments, portions of the stator assembly 26 or other portions of the electric machine 20 can be shrunk fit into the housing 12. Further, in some embodiments, the fit can at least partially secure the stator assembly 26, and as a result, the electric machine 20, in axial, radial and circumferential directions. In some embodiments, during operation of the electric machine 20 the fit between the stator assembly 26 and the housing 12 can at least partially serve to transfer torque from the stator assembly 26 to the housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor, an interior permanent magnet electric motor, or an induction motor for hybrid vehicle applications.

Figure 3:
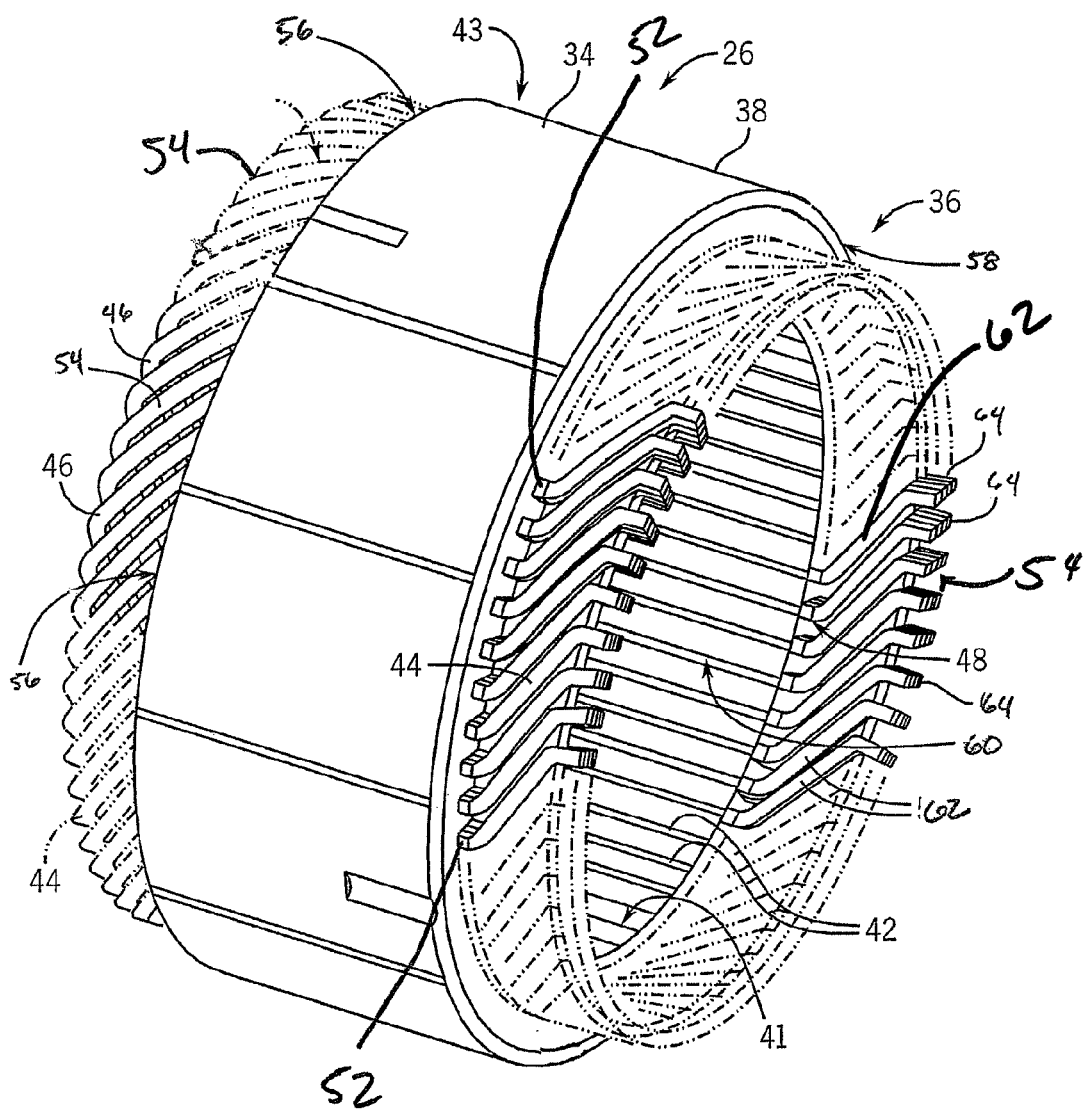
FIG. 3 is a perspective view of a stator assembly according to one embodiment of the invention.

As shown in FIG. 3, in some embodiments, the stator assembly 26 can comprise a stator core 34 and a stator winding 36 at least partially disposed within a portion of the stator core 34. For example, in some embodiments, the stator core 34 can comprise a plurality of laminations 38. In some embodiments, the laminations 38 can comprise a magnetic material such as iron-cobalt, silicon steel, a composite, or another suitable material. At least a portion of the laminations 38 can be coupled together using a bonding process (e.g., where a bonding agent is used to anneal the laminations 38 together so that a substantially or completely liquid-tight seal is formed) or another suitable coupling process. In some embodiments, some bonding agents that are capable of being used in the bonding process can comprise, loctite, titanium oxide, aluminum oxide, or any other suitable compound.

Figure 4:
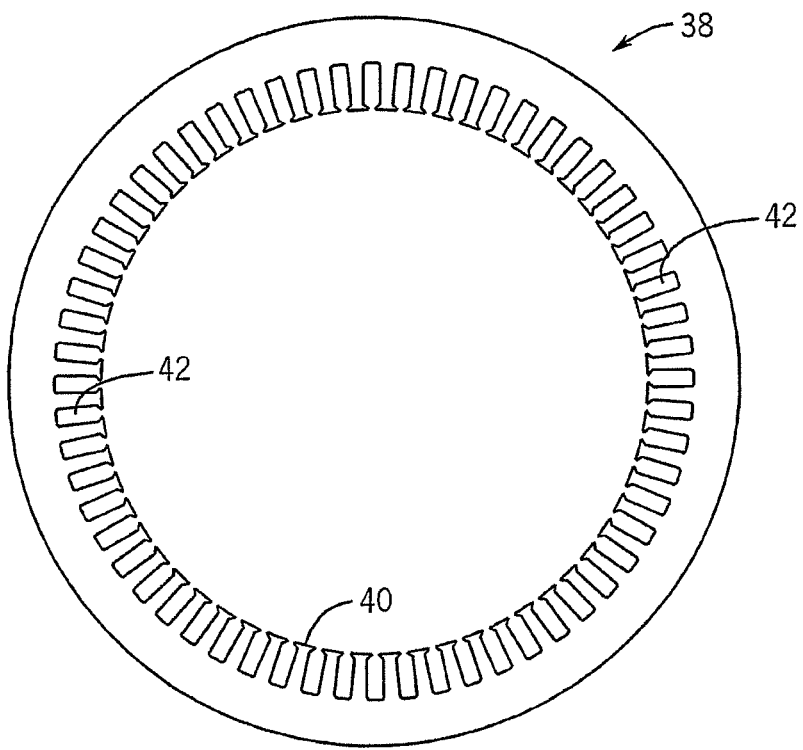
FIG. 4 is front view of a stator lamination according to one embodiment of the invention.

Referring to FIG. 4, in some embodiments, the laminations 38 can comprise a plurality of substantially radially-oriented teeth 40. In some embodiments, as shown in FIG. 3, when at least a portion of the plurality of laminations 38 are substantially assembled, the teeth 40 can substantially align to define a plurality of slots 42 that are configured and arranged to support at least a portion of the stator winding 36. As shown in FIG. 4, in some embodiments, the laminations 38 can include sixty teeth 40, and, as a result, the stator core 34 can include sixty slots 42. In other embodiments, the laminations 38 can include more or fewer teeth 40, and, accordingly, the stator core 34 can include more or fewer slots 42. Although depicted as substantially or completely axially linear, in some embodiments, the slots 42 can comprise a skewed and/or twisted configuration, which can lead to enhanced motor operations by reducing and/or eliminating torque ripple.

Moreover, in some embodiments, the stator core 34 can comprise an inner perimeter 41 and an outer perimeter 43. For example, in some embodiments, the stator assembly 26, including the stator core 34 can comprise a substantially cylindrical configuration so that the inner and outer perimeters 41, 43 can comprise inner and outer diameters, respectively. However, in other embodiments, the stator core 34 can comprise other configurations (e.g., square, rectangular, elliptical, regular or irregular polygonal, etc.), and, as a result, the inner and outer perimeters 41, 43 can comprise other dimensions.

Figure 5:
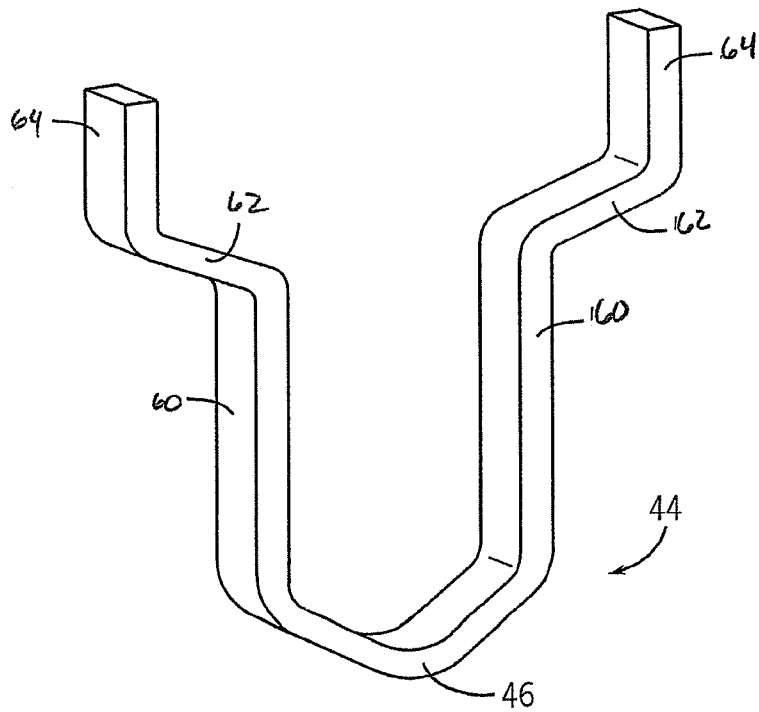
FIG. 5 is a perspective view of a conductor according to one embodiment of the invention.

In some embodiments, the stator winding 36 can comprise a plurality of conductors 44. In some embodiments, the conductors 44 can comprise a substantially segmented configuration (e.g., a hairpin configuration), as shown in FIGS. 3 and 5. For example, in some embodiments, at least a portion of the conductors 44 can include a turn portion 46 and at least two leg portions 48. In some embodiments, the turn portion 46 can be disposed between the two leg portions 48 to substantially connect the two leg portions 48. In some embodiments, the leg portions 48 can be substantially parallel. Moreover, in some embodiments, the turn portion 46 can comprise a substantially "u-shaped" configuration, although, in some embodiments, the turn portion 46 can comprise a v-shape, a wave shape, a curved shape, and other shapes. Additionally, in some embodiments, as shown in FIG. 5, at least a portion of the conductors 44 can comprise a substantially rectangular cross section. In some embodiments, at least a portion of the conductors 44 can comprise other cross-sectional shapes, such as substantially circular, square, hemispherical, regular or irregular polygonal, etc. In some embodiments, the conductors 44 can comprise other configurations (e.g., substantially non-segmented configuration). For example, in some embodiments, the stator winding 36 can comprise a conventional continuous wind and/or a conventional distributed wind configuration.

In some embodiments, the stator assembly 26 can comprise one or more insulating members, apparatuses, and/or other structures configured and arranged to provide mechanical, electrical, and physical insulation to some portions of the stator assembly 26. In some embodiments, at least a portion of some of the conductors 44 can comprise a first insulation 50. For example, in some embodiments, the first insulation 50 can comprise a resinous material such as an epoxy and/or an enamel that can be reversibly or irreversibly coupled to at least a portion of the conductors 44. In some embodiments, because an electrical current circulates through the conductors 44 during operation of the electric machine 20, the first insulation 50 can function, at least in part, to substantially prevent short circuits and/or grounding events between adjacent conductors 44 and/or conductors 44 and the stator core 34.

In some embodiments, the first insulation 50 can comprise a shrunk-fit structure coupled to at least some of the conductors 44 so that the first insulation 50 is retained when the conductors 44 are disposed within the stator core 28. In some embodiments, the first insulation 50 can be wrapped, wound, or otherwise disposed on, or coupled to, the conductors (e.g., via an adhesive). In some embodiments, as discussed further below, at least a portion of the conductors 44 can substantially function without some or all of the first insulation 50.

In some embodiments, the conductors 44 can be generally fabricated from a substantially linear conductor 44 that can be configured and arranged to a shape substantially similar to the conductor in FIG. 5. For example, in some embodiments, a machine (not shown) can apply a force (e.g., bend, push, pull, other otherwise actuate) to at least a portion of a conductor 44 to substantially form the turn portion 46 and the two leg portions 48 of a single conductor 44. In some embodiments, at least a portion of the conductors 44 can be configured into a desired shape after coupling of the first insulation 50 to the conductors 44. Although, in some embodiments, at least a portion of the conductors 44 can be configured (e.g., bent, pushed, pulled, etc.) into a desired shape (e.g., a hairpin) and then the first insulation 50 can be coupled to the conductors 44.

In some embodiments, the stator assembly 26 can comprise a second layer of insulation. In some embodiments, the second layer of insulation can comprise at least one slot member 52. In some embodiments, the stator assembly 26 can comprise at least one slot member 52 disposed in one or more of the slots 42. For example, one or more slot members 52 can be disposed in some or all of the slots 42. In some embodiments, each slot 42 can comprise at least one slot member 52. In some embodiments, at least a portion of the slot members 52 can comprise a substantially cylindrical shape. In some embodiments, the slot members 52 can comprise other shapes, such as square, rectangular, hemispherical, regular or irregular polygonal, etc. In some embodiments, at least a portion of the slot members 52 can comprise any shape desired and/or needed by the manufacturer or user. Moreover, in some embodiments, the slot members 52 can be configured and arranged to receive at least a portion of one or more conductors 44, as described in further detail below.

In some embodiments, the slot member 52 can comprise materials that can resist abrasion, can provide electrical and/or mechanical insulation, can comprise thermally-conductive properties, and/or can comprise other properties desired by a manufacturer or user. For example, in some embodiments, at least a portion of the slot members 52 can comprise materials such as polyimides (e.g., Kapton®), polyamides, polyester, polyamideimide, polyethylene terephthalate film (e.g., Mylar®), para-aramid (e.g., Kevlar®), meta-aramid (e.g., Nomex®) or other materials. In some embodiments, the slot member 52 can comprise a composite of some or all of the previously mentioned materials, such as a Nomex®-Katpton® composite.

In some embodiments, as shown in FIG. 3, at least a portion of the conductors 44 can be positioned substantially within the slots 42. For example, in some embodiments, the stator core 34 can be configured so that the plurality of slots 42 are substantially axially arranged. In some embodiments, the leg portions 48 can be inserted into the slots 42 so that at least some of the leg portions 48 can axially extend through the stator core 34. In some embodiments, the leg portions 48 can be inserted into neighboring slots 42. For example, in some embodiments, the leg portions 48 of a conductor 44 can be disposed in slots that are distanced approximately one magnetic-pole pitch apart (e.g., six slots, eight slots, etc.). In some embodiments, a plurality of conductors 44 can be disposed in the stator core 34 so that at least some of the turn portions 46 of the conductors 44 axially extend from the stator core 34 at an insertion end 56 of the stator assembly 26 and at least some of the leg portions 48 axially extend from the stator assembly 26 at a weld end 58 of the stator core 34. In some embodiments, at least a portion of the conductor 44 regions that axially extend from the stator assembly 26 at the ends 56, 58 can comprise stator end turns 54.

In some embodiments, one or more slot members 52 can be disposed within some or all of the slots 42 during assembly of the module 10. In some embodiments, the slot members 52 can be disposed within the slots 42 prior to one or more of the conductors 44 being disposed within the stator core 34. For example, in some embodiments, the slot members 52 can be positioned within the slots 42 so that at least a portion of some of the conductors 44 (e.g., the leg portions 48) can be at least partially disposed within the slot members 52. By way of example only, in some embodiments, one or more slot members 52 can be disposed within each of the slots 42 so that the slot members 52 can receive at least a portion of each of the conductors 44.

Figure 6B:
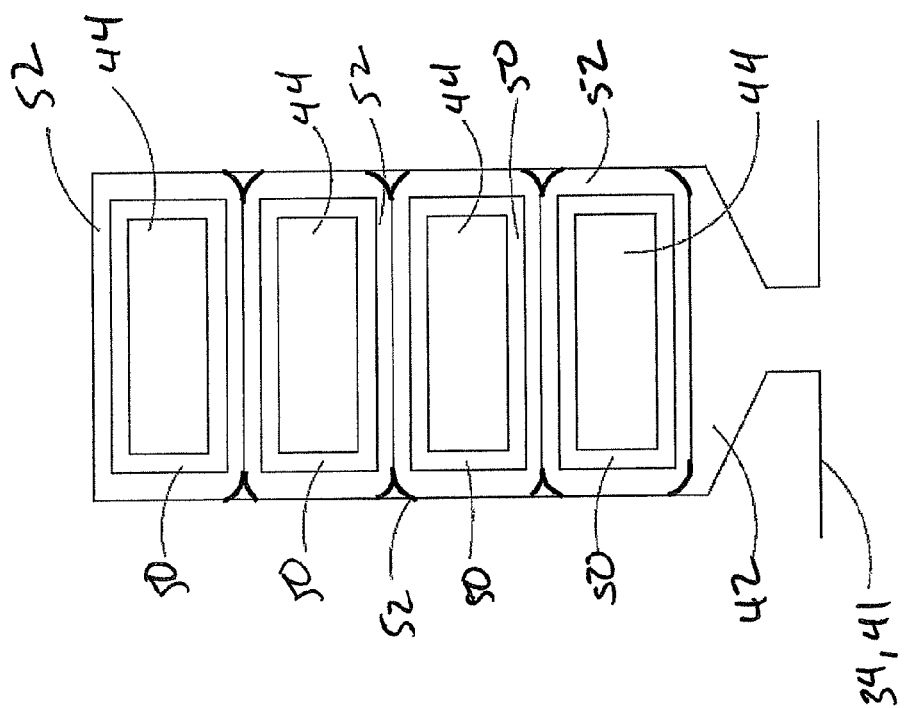

Moreover, in some embodiments, one slot member 52 can receive one or more conductors. In some embodiments, one slot member 52 can be configured and dimensioned to receive two or more conductors 44. For example, in some embodiments, at least a portion of the slot members 52 can be configured and arranged to receive portions of two conductors 44 (e.g., a leg portion 48 of two different conductors 44 or both leg portions 48 of the same conductor 44), as shown in FIG. 6A. As a result, in some embodiments, at least a portion of the slots 42 can comprise four conductors 44 and two slot members 52 (e.g., portions of two conductors 44 disposed in a slot member 52). In some embodiments, at least a portion of the slots 42 can comprise the same number of slot members 52 as conductors 44. For example, in a slot 42 including portions of four conductors 44, the slot 42 can comprise four or more slot members 52, as shown in FIG. 6B. Furthermore, in some embodiments, the stator assembly 26 can comprise any combination of any of the foregoing slot member 52/conductor 44 ratios. For example, some slots 42 can comprise four slot members 52 and four conductors 44, some slots 42 can comprise two slot members 52 and four conductors 44, and some slots can comprise one or more than one slot members 52 and four conductors 44. As previously mentioned, the use of four conductors 44 is exemplary and other number of conductors 44 (e.g., one, two, six, eight, etc.) can be disposed within the slots 42.

In some embodiments, at least some of the leg portions 48 can comprise multiple regions. In some embodiments, the leg portions 48 can comprise in-slot portions 60, angled portions 62, and connection portions 64. In some embodiments, as previously mentioned, the leg portions 48 can be disposed in the slots 42 and some regions of the leg portions 48 (e.g., the in-slot portions 60) can be at least partially received within the slot members 52. Moreover, the leg portions 48 can axially extend from the insertion end 56 to the weld end 58. In some embodiments, after insertion, at least a portion of the leg portions 48 positioned within the stator core 34 can comprise the in-slot portions 60.

In some embodiments, at least some regions of the leg portions 48 extending from stator assembly 26 at the weld and insertion ends 56, 58 can comprise the angled portions 62 and the connection portions 64. In some embodiments, after inserting the conductors 44 into the stator core 34, the leg portions 48 extending from the stator core 34 can undergo a conventional twisting process (not shown) which can lead to the creation of the angled portions 62 and the connection portions 64. For example, in some embodiments, the twisting process can locate the angled portions 62 at a more axially inward position and the connection portions 64 at a more axially outward position, as shown in FIG. 3. In some embodiments, the angled portions 62 can comprise other configurations, such as bent, curved, or otherwise removed from a horizontal axis of the conductors 44.

In some embodiments, after the twisting process, the connection portions 64 of at least a portion of the conductors 44 can be immediately adjacent to connection portions 64 of other conductors 44. As a result, the connection portions 64 can be coupled together to form one or more stator windings 36. In some embodiments, the connection portions 64 can be coupled via welding, brazing, soldering, melting, adhesives, or other coupling methods. Additionally, in some embodiments, at least a portion of the first insulation 50 can be substantially removed at the connection portions 64 in order to enable the coupling process. Although, in some embodiments, the first insulation 50 can be coupled to the conductors 44 so that it does not coat and/or cover the connection portions 64.

As shown in FIG. 1, in some embodiments, the sleeve member 14 can comprise a coolant jacket 66. For example, in some embodiments, the sleeve member 14 can include an inner surface 68 and an outer surface 70 and the coolant jacket 66 can be positioned substantially between the surfaces 68, 70. In some embodiments, the coolant jacket 66 can substantially circumscribe at least a portion of the electric machine 20. More specifically, in some embodiments, the coolant jacket 66 can substantially circumscribe at least a portion of the outer diameter 43 of the stator assembly 26, including some portions of the stator winding 36 (e.g., the stator end turns 54).

Further, in some embodiments, the coolant jacket 66 can contain a first coolant that can comprise transmission fluid, ethylene glycol, an ethylene glycol/water mixture, water, oil, motor oil, a mist, a gas, or another substance capable of receiving heat energy produced by the electric machine module 10. The coolant jacket 66 can be in fluid communication with a first coolant source (not shown) that can pressurize the first coolant prior to or as it is being dispersed into the coolant jacket 66, so that the pressurized first coolant can circulate through the coolant jacket 66.

Also, in some embodiments, the inner surface 68 can include coolant apertures 72 so that the coolant jacket 66 can be in fluid communication with the machine cavity 22. In some embodiments, the coolant apertures 72 can be positioned substantially adjacent to the stator end turns 54 on at least one of the weld end 58 and the insertion end 56. For example, in some embodiments, as the pressurized first coolant circulates through the coolant jacket 66, at least a portion of the first coolant can exit the coolant jacket 66 through the coolant apertures 72 and enter the machine cavity 22. Also, in some embodiments, the first coolant can contact the stator winding 36, which can lead to at least partial cooling. After exiting the coolant apertures 72, at least a portion of the first coolant can flow through portions of the machine cavity 22 and can contact at least some module 10 elements, which, in some embodiments, can lead to at least partial cooling of the module 10.

In some embodiments, the coolant jacket 66 can provide thermal transfer from portions of the electric machine module 10 without the need for some or all of the coolant apertures 72. For example, in some embodiments, the coolant jacket 66 can remain substantially or completely sealed relative to the machine cavity 22. As a result, the first coolant can remain contained within the coolant jacket 66 so that no material amounts of the first coolant enter the machine cavity 22. For example, in some embodiments, the first coolant can comprise an electrically conductive material (e.g., water, a water/ethylene glycol mixture, etc.) so that it is desirous to keep the first coolant from contacting portions of the electric machine 12. In order to accomplish thermal transfer from the electric machine 12 without physically contacting portions of the electric machine 12 with current flowing through them (e.g., the stator end turns 54), the coolant jacket 66 can be sealed relative to the machine cavity 22. At least some portions of the first coolant can flow through the sealed coolant jacket 66 and receive thermal energy produced by some portions of the electric machine 12 via conduction and convection, leading to improved machine performance via cooler operating temperatures.

Figure 7:
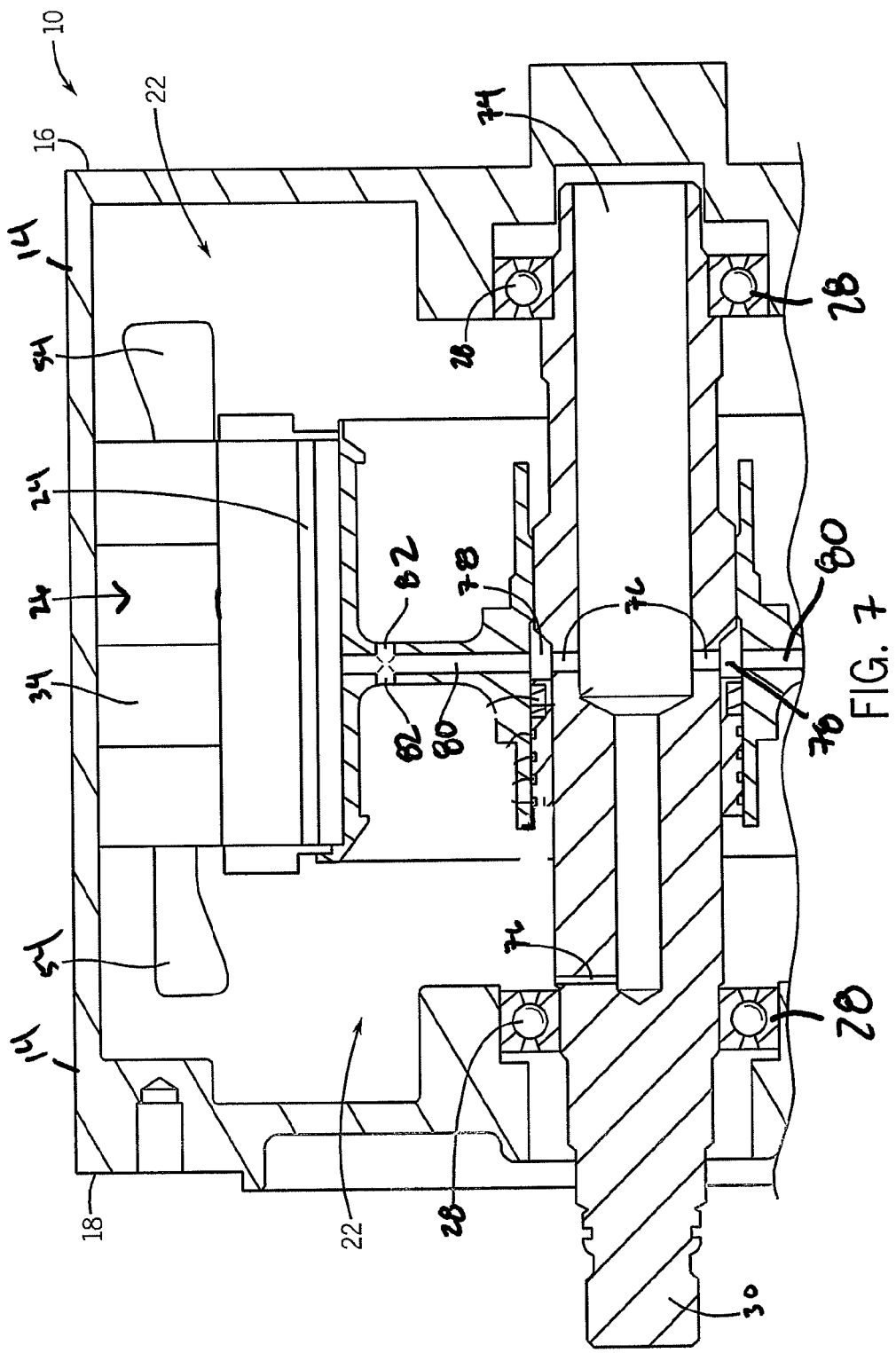
FIG. 7 is a cross-sectional view of a rotor assembly according to one embodiment of the invention.

In some embodiments, a second coolant can be dispersed from a point generally radially central with respect to the electric machine module 10. In some embodiments, the coolant can comprise a number of substances, including, but not limited to transmission oil, motor oil, another oil, or another suitable substance. In some embodiments, a source of the second coolant (not shown) can comprise the same or a different coolant source than the first coolant. In some embodiments, the second coolant source can be located either internal or adjacent to the shaft 30 so that the second coolant can flow either inside of or adjacent to the shaft 30. For example, as shown in FIG. 7, in some embodiments, the shaft 30 can include at least one shaft channel 74 and at least one shaft coolant outlet 76 so that at least a portion of the second coolant can flow through the channel 74. Moreover, at least a portion of the second coolant can exit the shaft channel 74 through the shaft coolant outlet 76. In some embodiments, the shaft 30 can comprise a plurality of shaft coolant outlets 76.

Also, in some embodiments, the shaft coolant outlet 76 can be in fluid communication with a cavity 78 defined between an outer diameter of the shaft 30 and an inner diameter of the rotor hub 32. As a result, as the second coolant circulates through the shaft coolant outlet 76, at least a portion of the second coolant can enter the cavity 78. Also, in some embodiments, shaft coolant outlets 76 can be positioned along at least a portion of an axial length of the shaft 30 so that portions of the second coolant can be dispersed to different areas of the module 10, including the bearings 28.

As shown in FIG. 7, some embodiments of the invention can include at least one rotor hub channel 80 and at least one rotor hub outlet 82. In some embodiments, the rotor hub channel 80 can be positioned within the rotor hub 32 and can be generally perpendicular to a horizontal axis of the shaft 30. For example, in some embodiments, the rotor hub channel 80 can comprise a passage that can extend from an outer diameter of the rotor hub 32, proximate to the rotor 24, to the inner diameter of the rotor hub 32, proximate to the cavity 78, although the rotor hub channel 80 need not extend the entire radial length of the rotor hub 32. Furthermore, in some embodiments, the rotor hub channel 80 can be in fluid communication with the cavity 78 so that at least a portion of the second coolant entering the cavity 78 can circulate through the rotor hub channel 80. In some embodiments, centrifugal force created by the movement of the operating rotor assembly 24 can cause at least some of the second coolant to flow from the cavity 78 radially outward through the rotor hub channel 80.

In some embodiments, the rotor hub outlet 82 can also be positioned within the rotor hub 32 and can be oriented generally parallel to the horizontal axis of the shaft 30. In some embodiments, the rotor hub 32 can comprise a plurality of rotor hub outlets 82. Also, in some embodiments, the rotor hub outlet 82 need not be oriented generally parallel to the horizontal axis of the shaft 30, and can be oriented in a direction desired by the manufacturer and/or end user. In some embodiments, the rotor hub outlet 82 can fluidly connect the rotor hub channel 80 with the machine cavity 22. For example, as previously mentioned, in some embodiments, at least a portion of the second coolant can circulate radially outward from the cavity 78 through the rotor hub channel 80 and at least a portion of the second coolant can flow through the rotor hub outlet 82 and enter the machine cavity 22. In some embodiments, after flowing through the rotor hub outlet 82, at least a portion of the second coolant can axially and radially flow through some portions of the machine cavity 22 and can come in contact with, and can receive thermal energy from many of the previously mentioned electric machine module 10 components, which can lead to electric machine cooling.

Figure 8A:
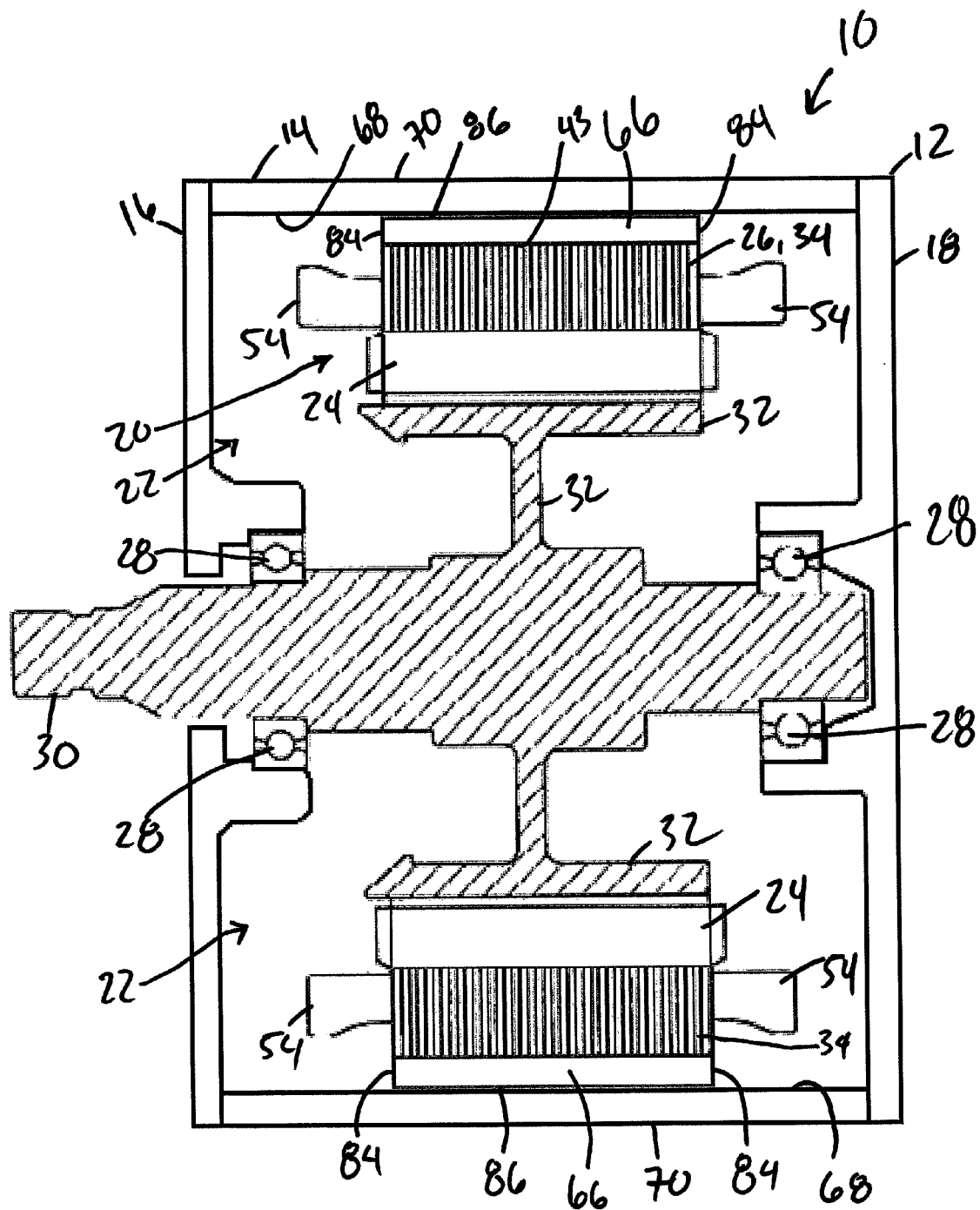
FIG. 8A is a cross-sectional view of an electric machine module according to one embodiment of the invention.
Figure 8D:
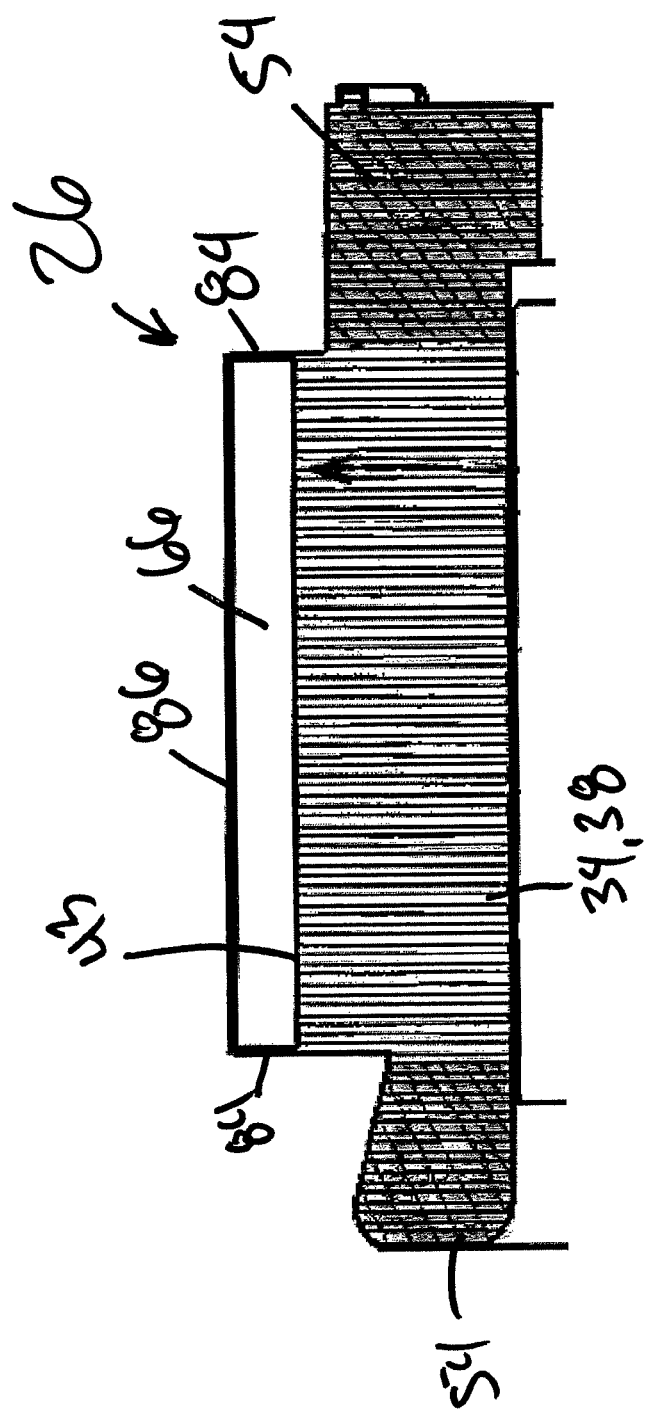
FIG. 8B is a cross-sectional view of a portion of an electric machine according to one embodiment of the invention.

In some embodiments, the coolant jacket 66 can comprise one or more alternative configurations. For example, in some embodiments, at least a portion of the coolant jacket 66 can be defined by some portions of the stator assembly 26. For example, as shown in FIGS. 8A and 8B, in some embodiments, portions of the stator assembly 26 (e.g., the stator core 34) can comprise at least two extended members 84 on opposing axial sides of the stator core 34. The extended members 84 can radially extend from regions of the stator core 34 immediately adjacent to axial ends (i.e., the insertion and weld ends 56, 58). Moreover, as shown in FIGS. 8A and 8B, at least one annular member 86 can be coupled to the extended members 84 to form at least a portion of the coolant jacket 66. For example, in some embodiments, the outer perimeter 43 of the stator core 34 can define at least a portion of a floor and/or lower boundary of the coolant jacket 66. Further, the extended members 84 can define lateral walls and/or axial boundaries of the coolant jacket 66. Additionally, in some embodiments, the annular member 86 can define a ceiling and/or an upper boundary of the coolant jacket 66. As a result, in some embodiments, the coolant jacket 66 can be substantially or completely integral with respect to the stator assembly 26.

In some embodiments, one or more of the extended members 84 can comprise alternative configurations. In some embodiments, the extended members 84 can comprise extended laminations 38. For example, one or more of the laminations 38 to be positioned at the axial ends of the stator core 34 can comprise an extended outer diameter (e.g., the outer diameter of the extended laminations 38 can be greater than the outer diameter of at least some of the other laminations 38 and the inner diameters of some or all of the laminations 38 can be the same). As a result, upon assembly of the stator core 34, the extended laminations 38 at the insertion and weld ends 56, 58 of the stator core 34 can form the extended members 84 (e.g., the extended laminations 38 can extend a greater radial distance relative to the remaining laminations 38), as shown in FIGS. 8A and 8B.

In some embodiments, the extended members 84 can comprise other configurations. For example, some or all of the laminations 38 comprising the stator core 34 can comprise substantially or completely identical outer diameters so that the stator core 34 comprises a substantially uniform outer perimeter 43. In some embodiments, one or more joined laminations (not shown) can be coupled to one or more of the laminations 38 disposed adjacent to the axial ends of the stator core 34. The joined laminations can be coupled to the stator core 34 using a process substantially similar to the previously mentioned processes that can be used to form the stator core 34. Moreover, in some embodiments, the joined laminations can be coupled to laminations 38 to be used at the axial ends of the stator core 34 prior to, concurrent to, or after assembly of the stator core 34.

In some embodiments, the extended members 84 can comprise other configurations. For example, in some embodiments, any other suitable material (not shown) can be coupled to one or more of the laminations 38 disposed adjacent to the axial ends of the stator core 34, in a manner substantially similar to the previously mentioned joined laminations. By way of example only, the material can comprise a substantially similar composition as the laminations 38 so that the material does not significantly impact electric machine 20 operations (e.g., magnetic flux path).

In some embodiments, as previously mentioned, the annular member 86 can define at least a portion of the coolant jacket 66. Moreover, although named an "annular" member 86, the annular member 86 can comprise any suitable shape or configuration that can be coupled to the extended members 84 to define the coolant jacket 66. For example, the annular member 86 can comprise shapes such as elliptical, square, rectangular, regular or irregular polygonal, etc. In some embodiments, the annular member 86 can comprise iron-cobalt, silicon steel, a composite, steel, or any other suitable material. Moreover, in some embodiments, the annular member 86 can be coupled to the extended members 84 at a radially outer position using a sound sealing and joining process, such as the bonding process described above or another suitable coupling process, mechanical or otherwise. As a result, in some embodiments, the coolant jacket 66 can remain substantially sealed relative to the machine cavity 22 (i.e., the coupling process can produce a fluid-tight seal at the interface between the extended members 84 and the annular member 86). In some embodiments, after assembly of the stator assembly 26 and integral coolant jacket 66, the stator assembly 26 can be installed within and/or coupled to at least a portion of the housing 12 (e.g., the sleeve member 14), as previously mentioned (i.e., the annular member 86 can be disposed immediately adjacent to the inner surface 68). Moreover, in some embodiments, one or both of the extended members 84 can be configured to pass and/or carry torque from the stator assembly 26 to the housing 12 when the stator assembly 26 is installed within the housing 12.

In some embodiments, one or more first coolant channels (not shown) can be disposed through at least some portions of the housing 12 and/or the annular member 86. As a result, the coolant jacket 66 can be in fluid communication with the first coolant source so that at least a portion of the first coolant can circulate through the coolant jacket 66. Accordingly, in some embodiments, the first coolant can circulate through integral coolant jacket 66 and the second coolant can flow from the rotor hub 32, as previously mentioned.

In some embodiments, the coolant jacket 66 that is integral with the stator assembly 26 can be configured and arranged to accommodate some portions of the electric machine module 10. For example, one or more fasteners or through bolts can be used to coupled together some portions of the housing 12 or couple the module 10 to other elements (e.g., a transmission, engine casing, etc.) and the coolant jacket 66 can be configured to receive at least a portion of the through bolts. In some embodiments, one or more apertures (not shown) can be disposed through the extended members 84 so that a through bolt can axially extend through the coolant jacket 66. In some embodiments, after positioning the through bolt, the apertures can be sealed so that the coolant jacket 66 remains fluid-tight relative to the machine cavity 22.

In some embodiments, the coolant jacket 66 can comprise one or more cooling fins (not shown). For example, in some embodiments, the outer diameter of some or all of the laminations 38 can comprise discrete extensions (not shown) that, after assembly of the stator assembly 26 can radially extended into the coolant jacket 66 to form the cooling fins. As a result, as the first coolant flows through the coolant jacket 66, the cooling fins can create turbulence and serve as additional surface area for thermal transfer from the electric machine 20 to the first coolant.

In some embodiments, the combination of the first and second coolants can at least partially improve cooling relative to some conventional configurations. For example, some conventional configurations can include a coolant jacket 66 that can comprise a dielectric substance that can be used to cool electric machine module 10 components via conduction, however, at least some of these dielectric substances are not as efficient at receiving thermal energy as are some substances that are not strongly dielectric (e.g., water, ethylene glycol, etc.). As a result, less than optimal cooling can occur. Some embodiments of the invention can offer improved cooling relative to some conventional configurations. For example, by concentrating a coolant that can more efficiently receive thermal energy (i.e., the first coolant) at a position where more thermal energy is produced (e.g., immediately adjacent to the stator assembly 26) and also introducing the second coolant from a radially central location (e.g., the rotor hub 32), more areas of the electric machine module 10 can be cooled in a more efficient manor.

Moreover, some embodiments of the invention can provide further benefits because the coolant jacket 66 can be substantially or completely integral with the stator assembly 26. For example, because of the integral coolant jacket 66, thermal energy can be more quickly transferred to the first coolant relative to embodiments where the housing 12 comprises the coolant jacket 66 because the first coolant is closer to a significant thermal energy source (i.e., the stator assembly 26). Furthermore, the integral coolant jacket 66 can be more easily formed and implemented, and thus, less expensively manufactured compared to coolant jackets 66 within the housing 12 because fewer materials and manufacturing processes are required. Additionally, lighter composite materials can be used to manufacture some portions of the housing 12 (e.g., the sleeve member 14) because the coolant jacket 66 is not disposed within the housing 12. Accordingly, the total weight of the electric machine module 10 can be reduced compared to modules 10 with coolant jackets 66 disposed within the housing 12.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   a housing including an inner surface that at least partially defines a machine cavity; and
   an electric machine at least partially positioned within the machine cavity and at least partially enclosed by the housing, the electric machine further comprising
      a stator assembly including an outer diameter, a stator core, and a stator winding, the stator core including at least two extended members radially extending from axial ends of the stator core, and
      an annular member being coupled to the extended members to form a portion of a coolant jacket, the coolant jacket being defined between the annular member, the extended members, and the outer diameter of the stator assembly, and the electric machine being positioned within the housing so that at least a portion of the annular member is immediately adjacent to the inner surface.

2. The electric machine module of claim 1, wherein the stator core comprises a plurality of laminations that each comprise an inner diameter and an outer diameter.

3. The electric machine module of claim 2, wherein the extended members comprise extended laminations comprising an outer diameter greater than the outer diameter of at least a portion of the remaining laminations.

4. The electric machine module of claim 1, wherein the stator winding comprises a plurality of conductors.

5. The electric machine module of claim 4, wherein each of the conductors comprises an insulation.

6. The electric machine module of claim 1, wherein the coolant jacket is configured to receive a first coolant.

7. The electric machine module of claim 6, wherein the first coolant comprises at least one of water, ethylene glycol, oil, and transmission fluid.

8. The electric machine module of claim 1, wherein the coolant jacket is sealed relative to the machine cavity.

9. The electric machine module of claim 1, wherein the electric machine further comprises a rotor assembly including a rotor hub.

10. The electric machine module of claim 9, wherein the rotor hub is configured and arranged to guide a volume of a second coolant into the machine cavity.

11. The electric machine module of claim 10, wherein the second coolant comprises a dielectric fluid.

12. An electric machine module comprising:
    a housing including an inner surface that defines a machine cavity;
    an electric machine at least partially positioned within the machine cavity, the electric machine including
       a stator assembly including an outer diameter and a stator core, the stator core including at least two extended members radially extending from axial ends of the stator core, an annular member being coupled to the extended members to form at least a portion of coolant jacket that circumscribes at least a portion of the stator assembly, the coolant jacket being defined by the annular member, the extended members, and the outer diameter of the stator assembly, and the electric machine being positioned within the housing so that at least a portion of the annular member is immediately adjacent to the inner surface, and
       a rotor assembly including a rotor hub, the rotor hub including at least one rotor hub channel and at least one rotor hub outlet; and
    a shaft being coupled to a portion of the rotor assembly, the shaft comprising at least one shaft channel and at least one shaft coolant outlet.

13. The electric machine module of claim 12, wherein the stator assembly comprises a stator winding.

14. The electric machine module of claim 12, wherein the shaft channel is in fluid communication with the shaft coolant outlet and the shaft coolant outlet is in fluid communication with the rotor hub channel.

15. The electric machine module of claim 14, wherein the rotor hub channel is in fluid communication with the rotor hub outlet, and the rotor hub outlet is in fluid communication with the machine cavity.

16. The electric machine module of claim 12, wherein the shaft channel, the shaft coolant outlet, the rotor hub channel, and the rotor hub inlet are configured and arranged to receive a second coolant.

17. The electric machine module of claim 16, wherein the coolant jacket is sealed relative to the machine cavity and is configured to receive a first coolant that is different from the second coolant.

18. The electric machine module of claim 17, wherein the first coolant and the second coolant comprise at least two of water, ethylene glycol, a water/ethylene glycol mixture, an oil, and transmission fluid.

* * * * *